United States Patent
Ichikawa et al.

(10) Patent No.: US 7,075,806 B2
(45) Date of Patent: Jul. 11, 2006

(54) DC VOLTAGE CONVERSION CIRCUIT

(75) Inventors: Tomoyuki Ichikawa, Shizuoka (JP); Shinji Ohta, Shizuoka (JP)

(73) Assignee: Koito Manufacturing Co., Ltd., Shizuoka (JP)

(*) Notice: Subject to any disclaimer, the term of this patent is extended or adjusted under 35 U.S.C. 154(b) by 74 days.

(21) Appl. No.: 10/861,297

(22) Filed: Jun. 4, 2004

(65) Prior Publication Data
US 2004/0246750 A1 Dec. 9, 2004

(30) Foreign Application Priority Data
Jun. 5, 2003 (JP) .................. P. 2003-160891

(51) Int. Cl.
*H02M 5/24* (2006.01)

(52) U.S. Cl. ............... 363/97; 363/41; 315/276
(58) Field of Classification Search ............ 363/16–20, 363/95, 97, 127; 315/307, 291, 224, 225
See application file for complete search history.

(56) References Cited

U.S. PATENT DOCUMENTS
6,198,638 B1* 3/2001 Lee .................. 363/21.14

FOREIGN PATENT DOCUMENTS
| JP | 08-195290 | 7/1996 |
| JP | 8-195290 | 7/1996 |
| JP | 2002-374672 | 12/2002 |
| WO | WO 03/036782 A2 | 5/2003 |

* cited by examiner

*Primary Examiner*—Rajnikant B. Patel
(74) *Attorney, Agent, or Firm*—Fish & Richardson PC (57) ABSTRACT

In a fly-back DC voltage conversion circuit, a transformer accumulates energy during the on-state of a switching element, and the accumulated energy is outputted from a secondary winding during the off-state of the switching element. The switching element is placed in the on-state when the accumulated energy is completely outputted from the secondary winding. A voltage applied to the switching element is differentiated by a capacitor to detect a discharge termination point at which the current of the transformer becomes zero to change a switching frequency of the switching element. The DC voltage conversion circuit can attain control in a current boundary state without significantly increasing cost.

9 Claims, 6 Drawing Sheets

TIME LAPSE DIRECTION

FIG. 6

DC VOLTAGE CONVERSION CIRCUIT

BACKGROUND

The present disclosure relates to techniques for enhancing circuit efficiency and reducing cost of a flyback-type DC voltage conversion circuit.

A voltage conversion circuit for converting a DC input voltage into a desired DC voltage (a "DC—DC converter") is used for a lighting circuit for a discharge lamp, such as a metal halide lamp. A flyback-type configuration, which may be used as the voltage conversion circuit, includes a transformer and a switching element provided on the primary side thereof and is arranged to control an output by changing a duty ratio of a driving signal for the element. That is, the flyback-type voltage conversion circuit is configured such that the switching element is coupled to the primary winding of the conversion transformer to perform on/off control of the element. A rectifying diode and a smoothing capacitor are provided on the secondary side of the transformer.

As disclosed in Japanese patent document JP-A-8-195290, a switching element may be operated so that current flowing into the transformer is placed in a boundary state.

For situations in which the switching element is placed in an on-state when energy accumulated in the transformer is completely discharged on the secondary side of the transformer (i.e., a current boundary mode), the switching element is placed in the on-state after the current flowing into the rectifying diode becomes zero ampere. Thus, advantageously, power loss does not occur at a reverse recovery time, and electric efficiency is good (i.e., power loss is small) when switching with a relatively high frequency (e.g., several hundred kilo-hertz or more).

A problem that may occur is that the switching frequency for realizing the current boundary mode is not always constant, but changes due to the influence of the variation of an input voltage and the variation of a load.

For example, in the case of a lighting circuit for a discharge lamp, an electric power applied to the discharge lamp may differ between a transient state just after lighting the discharge lamp serving as a load and a steady lighting state of the discharge lamp. The frequency at which the element is placed in the current boundary mode varies due to the influence of the variation of the battery voltage or the applied electric power.

In order to control the switching frequency so that the target state is close to the current boundary state, a discharge termination time point where the secondary current of the transformer becomes zero must be detected so that the switching frequency can be controlled in response to the detection. However, a detection circuit for detecting the discharge termination time point is complex, and may typically requires a circuit element having a high voltage-tolerance. Difficulties arise in connection with miniaturization and cost reduction of the circuit.

Accordingly, it is desirable to improve the control in the current boundary state in a flyback-type DC voltage conversion circuit, without significantly increasing the cost.

SUMMARY

The disclosure relates to a flyback-type circuit configuration having a transformer, a switching element and a control means for performing control in a current boundary state so that the transformer accumulates energy during an on-state of the switching element. The energy thus accumulated is outputted from a secondary winding during an off-state of the switching element, and the switching element is placed in the on-state when the accumulated energy is completely outputted from the secondary winding.

A voltage applied to the switching element is differentiated to detect a discharge termination time point where a secondary current of the transformer becomes zero to change a switching frequency of the switching element by the control means.

Thus, because the voltage applied to the switching element is differentiated to detect the discharge termination time point relating to the secondary current to control the switching frequency, the driving control in the current boundary mode can be realized without causing an overly complicated circuit configuration.

Using the techniques described here, it is possible to improve electric efficiency and attain a small circuit configuration with a reduce cost.

The DC voltage conversion circuit can be applied to a lighting circuit for a discharge lamp such as a metal halide lamp used as a light source of a lamp for a vehicle, where the space for a device including the lighting circuit is restricted. The DC voltage conversion circuit can be used in a wide range of other applications including, for example, a power supply circuit.

DETAILED DESCRIPTION

Figure 1:
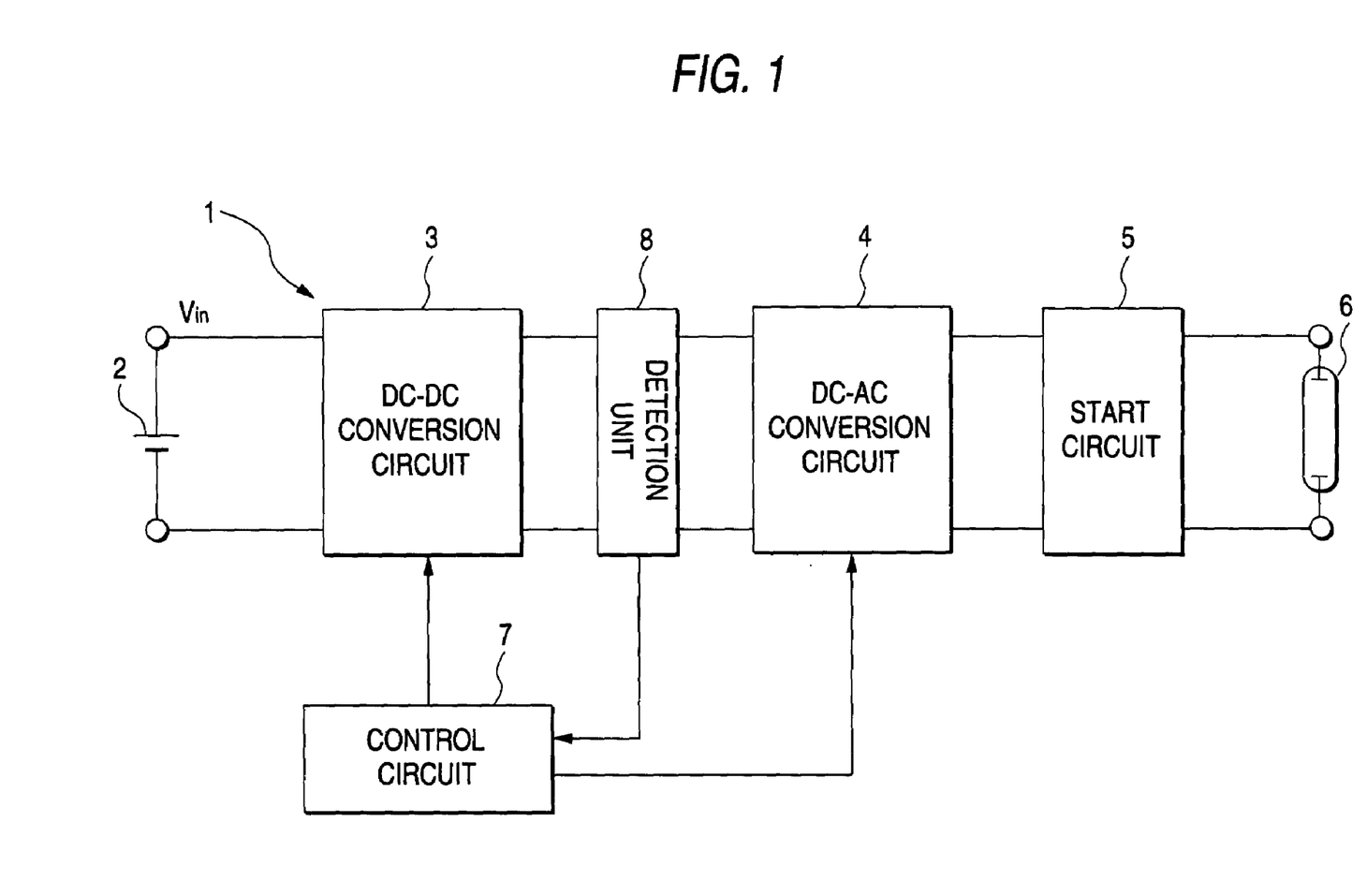
FIG. 1 is a circuit block diagram showing an example of the configuration of a lighting circuit for a discharge lamp.

FIG. 1 shows an example of a configuration of a lighting circuit for a discharge lamp using a DC conversion circuit according to the invention.

A lighting circuit 1 for a discharge lamp includes a DC power supply 2, a DC—DC conversion circuit 3, a DC-AC conversion circuit 4, a start circuit 5 and a control circuit 7.

The DC—DC conversion circuit 3 is provided to receive the power supply voltage from the DC power supply 2 and to perform the voltage conversion. That is, the DC—DC conversion circuit receives a DC input voltage ("Vin") from the DC power supply 2 to convert the DC input voltage into a desired DC voltage. Thus, the DC—DC conversion circuit includes a fly-back type circuit configuration having a transformer and a switching element as described in greater detail below.

The DC-AC conversion circuit 4 converts the output voltage of the DC—DC conversion circuit 3 into an AC voltage and supplies the AC voltage to a discharge lamp 6 through the start circuit 5. For example, the DC-AC conversion circuit may include a bridge type circuit using four semiconductor switching elements and a driving circuit for the bridge type circuit. The circuit is arranged so that two sets of the semiconductor switching elements are turned on and off alternately to output the AC voltage.

The start circuit, or starter, 5 generates a high-voltage pulse signal (a starting pulse) to start the discharge lamp 6. The pulse signal is superimposed on the AC voltage outputted from the DC-AC conversion circuit 4 and applied to the discharge lamp 6.

The control circuit 7 receives a detection signal corresponding to a voltage applied to the discharge lamp 6, a current flowing into the discharge lamp, or a voltage and a current corresponding thereto to control an electric power applied to the discharge lamp 6 and also control the output of the DC—DC conversion circuit 3. For example, the control circuit may receive the detection signal obtained from a detection unit 8 for detecting the output voltage and the output current of the DC—DC conversion circuit 3, and to control a supply electric power according to the state of the discharge lamp 6. The control circuit sends a control signal to the DC—DC conversion circuit 3 to control the output voltage thereof. Further, the control circuit sends a control signal to the DC-AC conversion circuit 4 to control the switching operation of the polarity relating to the alternate output thereof. The control circuit 7 also performs output control so that the supply voltage to the discharge lamp is increased to a certain level before lighting the discharge lamp 6 to ensure the lighting operation of the discharge lamp. Techniques such as PWM (pulse width modulation) and PFM (pulse frequency modulation) may be used as the switching control method for the DC—DC conversion circuit 3.

Figure 2:
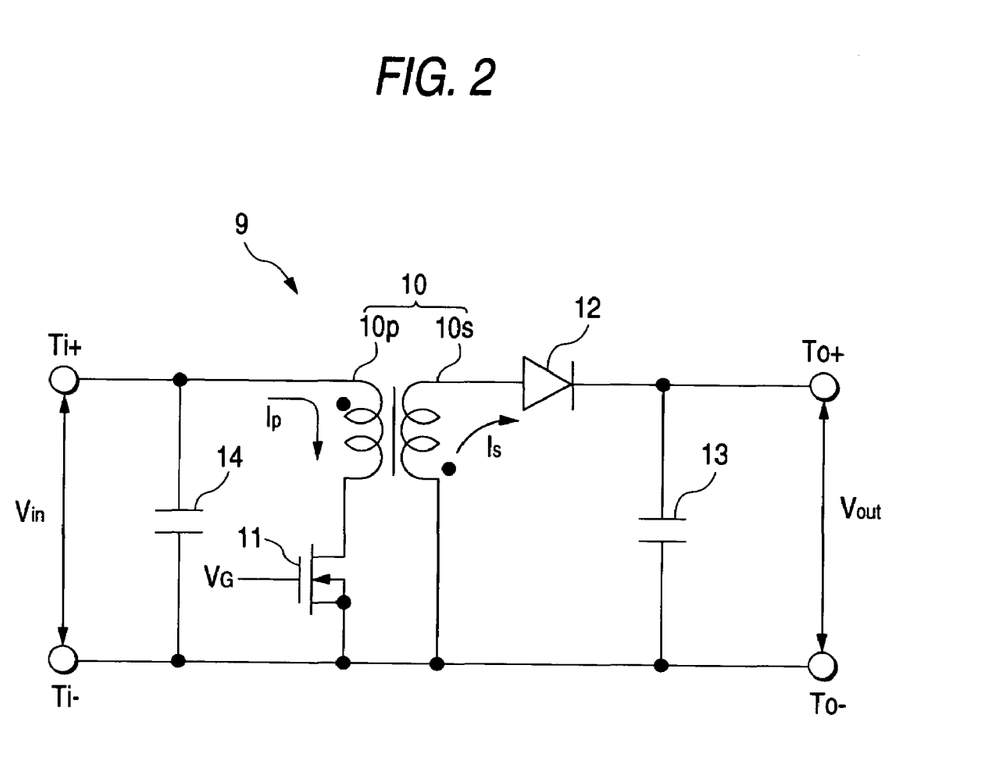
FIG. 2 is a circuit diagram showing an example of the configuration of a DC—DC conversion circuit.

FIG. 2 shows the main portion of the basic configuration 9 of an example of the flyback-type DC—DC converter (corresponding to a circuit portion constituting the power supply system to the discharge lamp in relation to the DC—DC conversion circuit 3). This example includes a transformer 10, a switching element 11, a rectifying diode 12 and a smoothing capacitor 13.

In FIG. 2, "Ti+" and "Ti–" represent input terminals to which the DC input voltage Vin is supplied. A capacitor 14 is provided between the terminals. Further, "To+" and "To–" represent output terminals from which the converted output voltage ("Vout") is sent to the succeeding circuit (the DC-AC conversion circuit).

The switching element 11 is coupled to the primary winding 10p of the transformer 10. The switching element is supplied with the driving signal from the control circuit 7. In the figure, an N-channel MOSFET (metal oxide semiconductor field effect transistor) is used as the switching element 11. The drain of the FET is coupled to the primary winding 10p of the transformer 10, and the source thereof is coupled to the input terminal Ti–.

The rectifying diode 12 and the smoothing capacitor 13 are provided on the secondary side of the transformer 10. One end of the secondary winding 10s of the transformer 10 is coupled to the anode of the rectifying diode 12; the other end of the secondary winding 10s is coupled to a line coupling the terminals Ti– and To–. The cathode of the rectifying diode 12 is coupled to the terminal To+ and one end of the smoothing capacitor 13. The smoothing capacitor 13 is provided between the output terminals To+ and To–, and the voltage between both the ends of the capacitor is outputted as Vout.

"Ip" and "Is" represent the primary current and the secondary current of the transformer 10, respectively, and "VG" represents a signal voltage for driving the gate of the FET (corresponding to the control voltage supplied from the control circuit 7).

Figure 3:
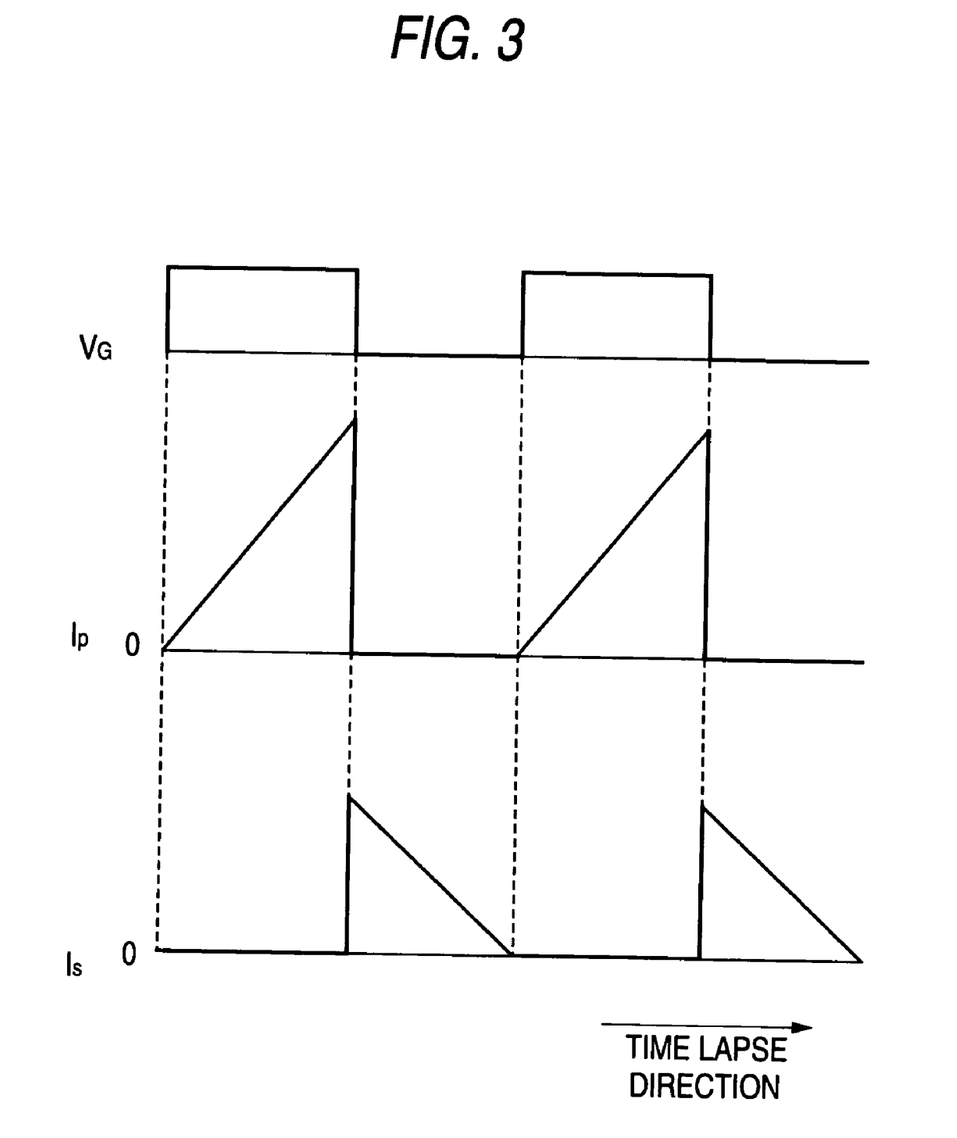
FIG. 3 is a diagram for explaining a current boundary mode.

FIG. 3 is a diagram for explaining the operation of the flyback type circuit and schematically shows waveforms of VG, Ip and Is in the current boundary mode from the upper side in the figure.

The switching element 11 is controlled so that the switching element is placed in an on-state when energy accumulated in the transformer 10 is completely discharged on the secondary side of the transformer 10. That is, as shown in the figure, the switching element 11 is turned on when the secondary current (Is) of the transformer 10 becomes zero amperes, and each of the currents Ip and Is becomes zero amperes at the rising start time point of VG.

The circuit can improve power loss in the reverse recovery time of the rectifying diode 12 provided on the secondary side of the transformer 10. Because the switching element 11 is placed in the on-state after the current flowing into the rectifying diode 12 becomes zero amperes in the current boundary mode, there arises no power loss in the reverse recovery time. Furthermore, the overall efficiency of the DC—DC converter may be improved, and a high electric efficiency may be realized.

The frequency for maintaining the current boundary state varies as a result of the influence of the change of the DC input voltage (Vin) and the change in the load. When the load is heavy (e.g., when the input voltage is low or the output voltage is large), since the amount of energy accumulated in the transformer at the single switching operation becomes large, the on-time of the switching element becomes long and, therefore, the switching frequency becomes low. In this respect, when the on-time is too long, the transformer saturates magnetically so that the lower limit of the switching frequency is determined.

Thus, the switching frequency may be controlled so that the switching frequency is set to the lower limit or a value near the lower limit during a heavy load. The switching frequency may be changed to attain the current boundary state for a light load or a steady load. For that purpose, the discharge termination time point at which the secondary current of the transformer becomes zero is detected.

The voltage applied across the non-control terminals of the switching element may be differentiated to detect the discharge termination time point to change the switching frequency in accordance with the detected time point. Other methods of detecting the discharge termination time point, such as by differentiating the secondary voltage of the transformer, may be used. However, the detection method using the switching element may be advantageous in terms of the voltage tolerance and cost, particularly if the generated voltage is lower in the switching element.

Figure 4:
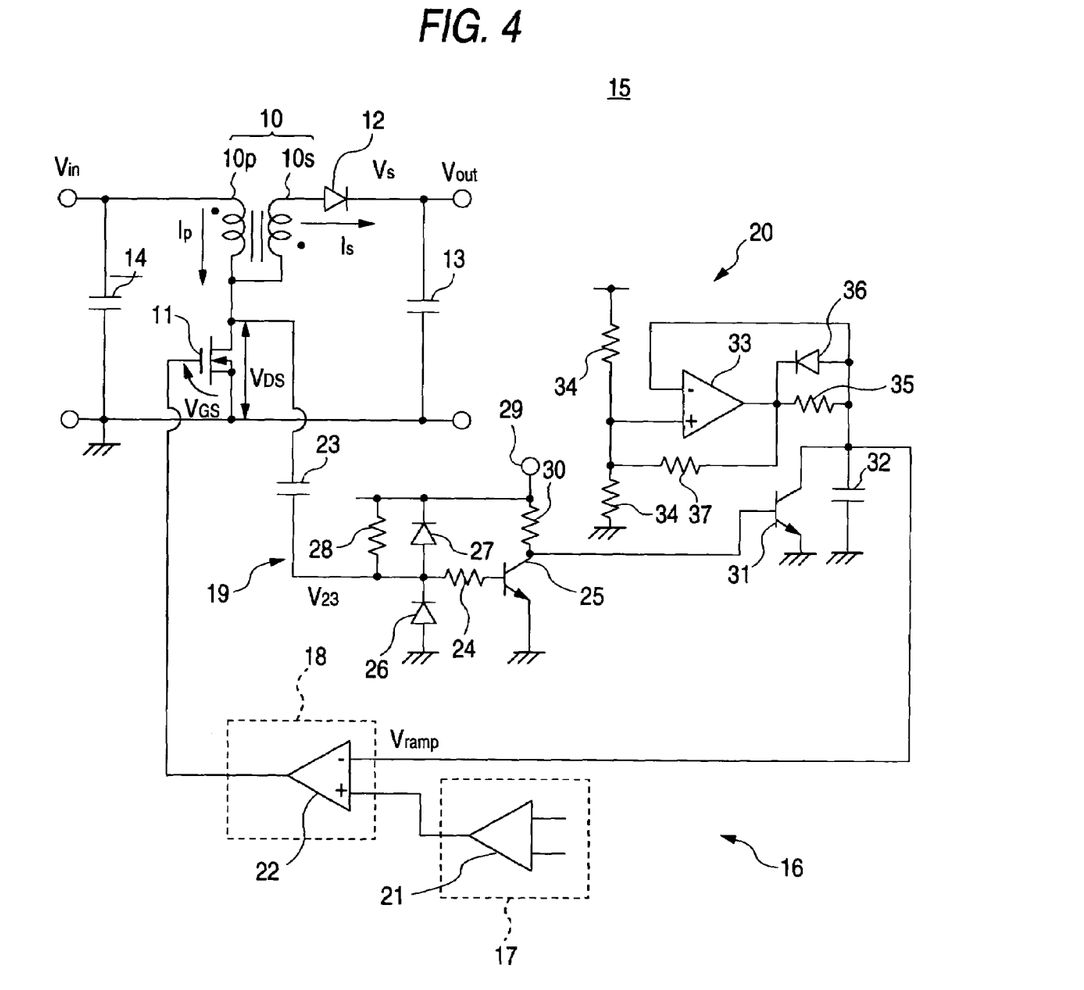
FIG. 4 is a diagram showing an example of the configuration of a DC voltage conversion circuit according to the invention.

FIG. 4 shows an example 15 of the DC voltage conversion circuit and schematically shows the main portion of the DC—DC conversion unit and the control unit thereof. This example employs the PWM control method (i.e., changing the duty cycle of the control pulse). The transformer 10 differs from the configuration of the transformer shown in FIG. 2 because one end of the primary winding 10p and one end of the secondary winding 10s are coupled to each other as well as coupled to the drain of the N-channel FET.

"VDS" and "VGS" shown in the figure represent the drain-source voltage and the gate-source voltage, respectively, of the FET that serves as the switching element. "Vs" represents the secondary voltage of the transformer 10.

A control means 16 controls the current boundary mode so that the switching element 11 is controlled to be in an on-state again when energy accumulated in the transformer 10 during the on-time of the switching element 11 is entirely outputted from the secondary winding 10s during the off-time of the switching element 11. The control means includes a power calculation unit 17, a calculation control unit 18, a timing detection unit 19 and a ramp wave generation unit 20.

The power calculation unit 17 controls the output based on the detection signal from the detection circuit (not shown) to detect the output voltage and the output current of the transformer 10. The circuit configuration of the power calculation unit depends on the control method. In one implementation, the power calculation unit is arranged so that an error amplifier 21 for calculating an electric power obtains an electric power from an output voltage detected by voltage dividing resistors provided at the output stage of the transformer 10. An output current is detected through voltage conversion by a current detection resistor provided at the output stage of the transformer 10. A control voltage signal from the electric power thus obtained is applied to the positive input terminal of the PWM comparator 22.

The calculation control unit 18 compares levels between a ramp wave supplied from the ramp wave generation unit 20 and the control voltage from the power calculation unit 17 to output the control signal to the switching element 11.

A PWM comparator 22 serves as the calculation control unit 18. The negative input terminal of the comparator is supplied with the ramp wave (or a saw-tooth wave) from the ramp wave generation unit 20 described below. The comparator outputs a rectangular-shaped pulse signal (a PWM signal) based on the level comparison between the ramp wave signal and the signal from the error amplifier 21. The pulse signal is applied to the control terminal (e.g., the gate in the case of the FET) of the switching element 11 through a buffer (not-shown).

The timing detection unit 19 detects when the secondary current (Is) of the transformer 10 becomes zero amperes. In the current boundary mode, since the switching element 11 is controlled so that the switching element is placed in the on-state when energy accumulated in the transformer 10 is completely discharged on the secondary side, the voltage applied to the switching element 11 is differentiated by the capacitor to detect the discharge termination point for the secondary current (Is).

In this example, an FET is employed as the switching element 11, and the discharge termination point for the secondary current (i.e., the time when the secondary current (Is) becomes zero) is detected by the differentiating operation of a capacitor 23 based on the waveform of the source drain voltage (VDS) of the FET. In the circuit configuration for detecting the timing based on the secondary voltage (Vs), positive and negative voltages are generated relative to the ground voltage (GND), for example. Thus, limiters for the positive and negative voltages are required for the input signal to the succeeding circuit, and the circuit configuration may become complex. In contrast, in the circuit configuration for detecting the timing based on the voltage VDS, since the voltage level (VDS) remains positive with respect to the GND voltage, the negative voltage is hardly generated as compared with the circuit configuration using the voltage Vs.

One end of the capacitor 23 is coupled to the drain of the FET, and the second end is coupled to the base of an NPN transistor 25 through resistor 24. The voltage at the second end is referred to as "V23."

A diode 26 clamps the voltage at a level equal to or smaller than the GND level. The cathode of the diode is coupled to a connection point between the capacitor 23 and the resistor 24 and also is coupled to a power supply terminal 29 of a predetermined voltage ("Vcc") through a diode 27 or resistor 28. The anode of the diode 26 is grounded. The anode of the diode 27 is coupled to the cathode of the diode 26, and the cathode of the diode 27 is coupled to the power supply terminal 29.

The collector of the NPN transistor 25, which is configured as a common-emitter type, is coupled to the power supply terminal 29 through resistor 30 and also is coupled to the base of an NPN transistor 31.

The ramp wave generation unit 20 generates the ramp wave whose frequency is controlled in accordance with the signal from the timing detection unit 19. In this example, the ramp wave generation unit includes a capacitor 32 and a portion for controlling the charging and discharging operation thereof. The ramp wave generation unit is configured in a manner that the capacitor 32 is charged until the timing detection unit 19 detects the discharge termination time point and that the NPN transistor 31 is turned on when the timing detection unit 19 detects the discharge termination time point thereby to discharge the capacitor 32.

In an operational amplifier 33 serving as a comparator, a predetermined voltage from voltage dividing resistors 34, 34 is applied to the non-inversion input terminal, and the terminal voltage of the capacitor 32 is applied to the inversion input terminal. The output terminal of the operational amplifier 33 is coupled to the capacitor 32 through a resistor 35 and also is coupled to the cathode of a diode 36. The anode of the diode 36 is coupled to one end of the capacitor 32. A resistor 37 is coupled between the non-inversion input terminal and the output terminal of the operational amplifier 33.

The NPN transistor 31, which is in parallel to the capacitor 32, is configured in a common-emitter type, and the collector of the NPN transistor is coupled to one end (the non-ground side terminal) of the capacitor 32. When the timing detection unit 19 detects the discharge termination point, the transistor 31 is turned on to form a discharge path for the capacitor 32. Thus, the charging and discharging operation of the capacitor 32 is performed to realize the frequency in the current boundary mode, whereby the terminal voltage of the capacitor is applied to the negative input terminal of the PWM comparator 22 as the ramp wave. The lower limit for the frequency of the ramp wave is determined by the time when the terminal voltage of the capacitor 32 exceeds the voltage of the non-inversion input terminal of the operational amplifier 33 in the off-state of the transistor 31 and so the capacitor 32 discharges.

Figure 5:
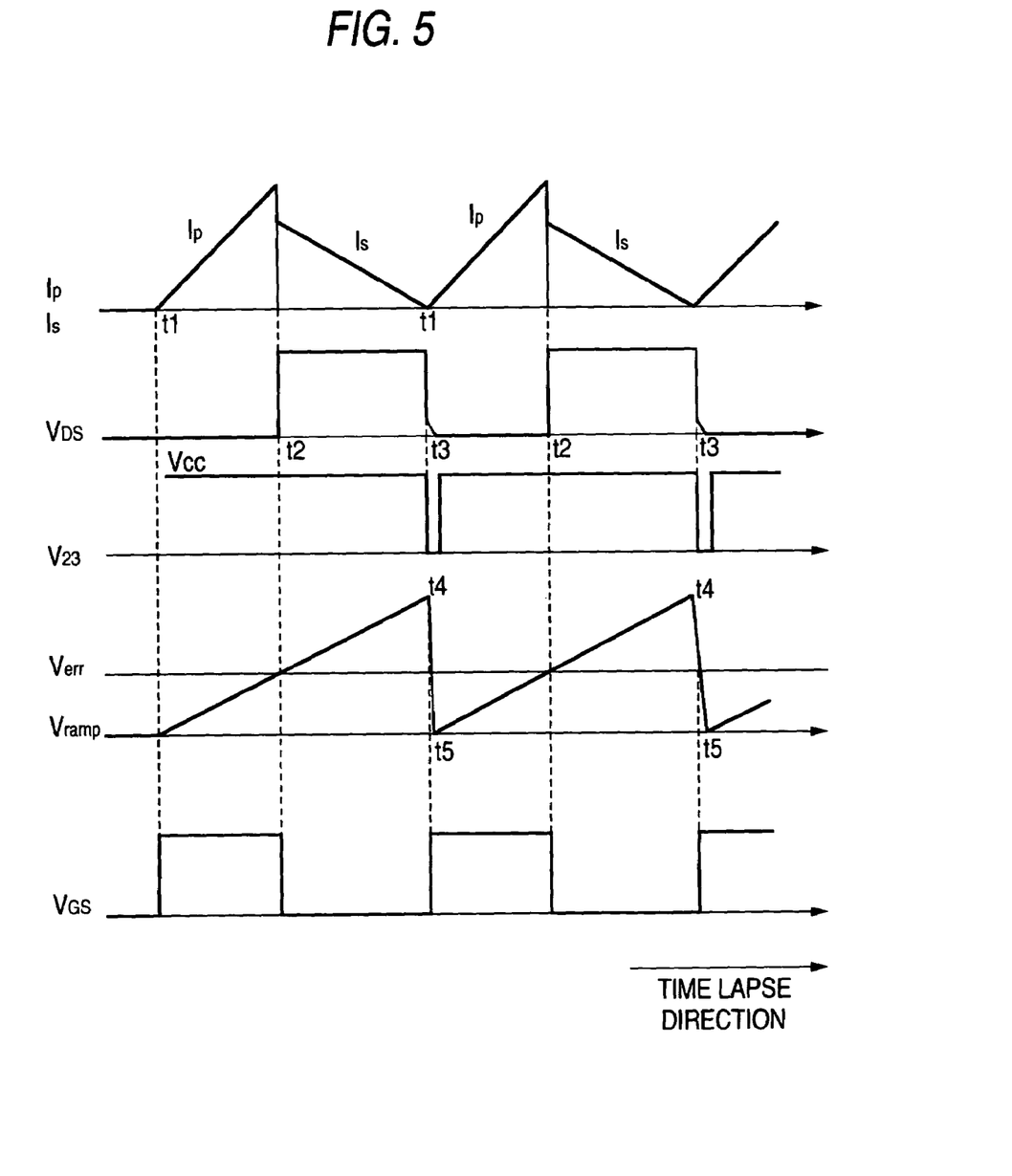
FIG. 5 is a waveform diagram for explaining the operation of the circuit in FIG. 4.

FIG. 5 is a waveform diagram. Various symbols in the figure represent the following:

"Vramp"=a signal level of the ramp wave generated by the ramp wave generation unit 20; and "Verr"=an output signal level of the error amplifier 21.

The symbols "Ip," "Is," "VDS," V23" and VGS" have the same meanings as discussed above.

The respective times t1 through t5 are defined as follows:
"t1"=time when the primary current Ip starts flowing;
"t2"=rising time point of VDS;
"t3"=falling time point of VDS;
"t4"=time when the capacitor 32 starts discharging; and
"t5"=time when discharging of the capacitor 32 terminates.

In the figure, the value of Verr is shown as constant for the sake of convenience. The voltage Vramp repeatedly changes so that the capacitor 32 starts charging at the time t1. Vramp increases gradually with a constant slope, and the capacitor 32 discharges its accumulated energy at the time t4 so that Vramp starts decreasing and returns to zero at the time t5.

Since the voltage (VDS) resonates when discharging for the current (Is) terminates, it is possible to determine the time representing the start of resonance by detecting an edge by differentiating VDS using the capacitor 23. That is, the timing detection unit 19 detects the negative-going edge of VDS. The detected voltage equal to or less than the GND level is clamped by the clamp diode 26, and the transistor 25 is placed in the off-state. The transistor 31 is placed in the on-state to discharge the capacitor 32.

Although Ip increases gradually during the period from time t1 to time t2, the current Ip becomes zero at time t2. In contrast, the current Is rises and reaches a certain value at time t2, and then decreases with the lapse of time and finally becomes zero.

VDS falls at time t3 after rising at time t2. The voltage V23 is obtained by differentiating the falling edges of VDS using the capacitor 23. That is, V23 exhibits zero volts for a certain time period after time t3, but exhibits Vcc at other times. V23 represents the voltage at the coupling point between the anode of the diode 27 and the cathode of the diode 26.

The PWM comparator 22 compares the voltages Vramp and Verr so that VGS exhibits a low level (L) when Vramp exceeds Verr, whereas VGS exhibits high level (H) when Vramp is equal to or less than Verr.

The duration from time t1 to time t5 corresponds to the period of the ramp wave, and the frequency of the ramp wave is influenced by the variation of the input voltage and the load. However, because the ramp wave is controlled by detecting the discharge termination point to change the switching frequency so that the switching frequency is at least a specified value, the DC voltage conversion circuit can be operated in the current boundary mode.

Figure 6:
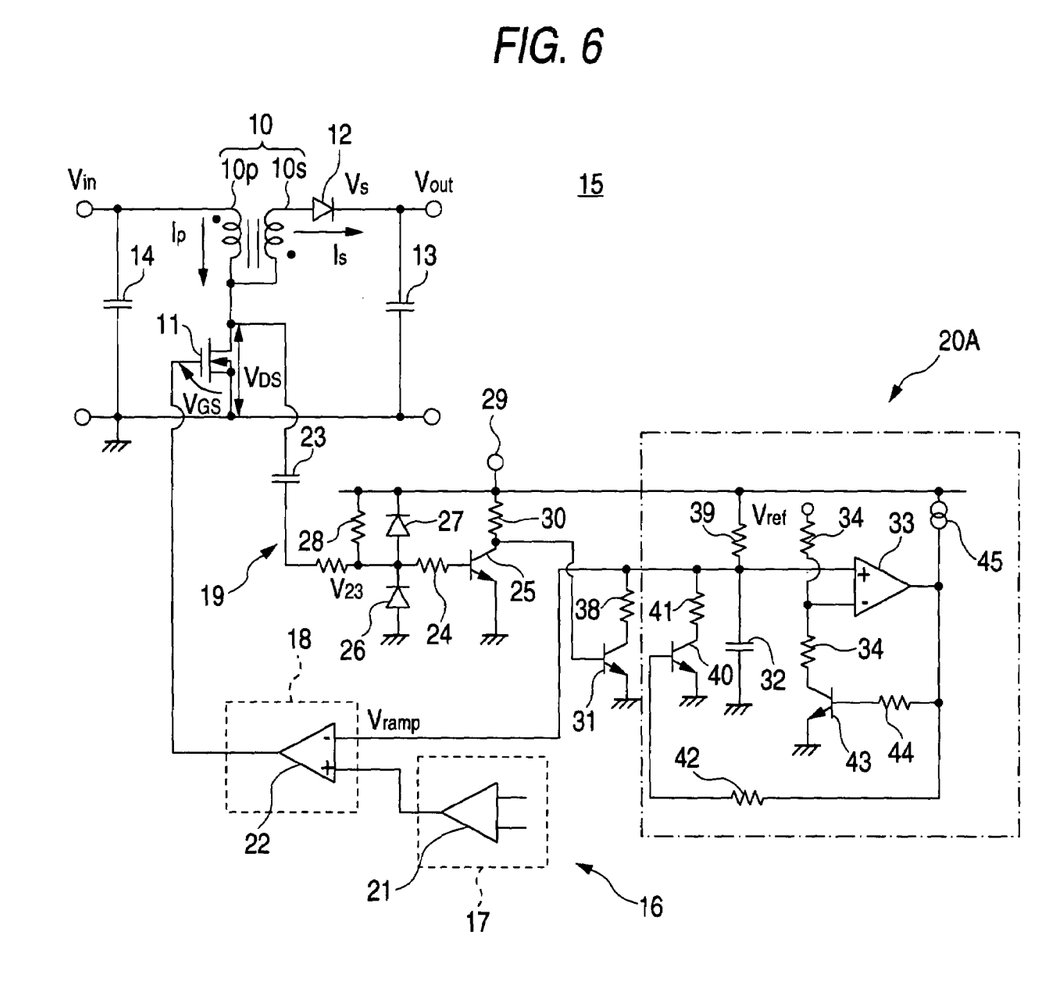
FIG. 6 is a diagram showing another example of the configuration of the DC voltage conversion circuit according to the invention.

The invention is not limited to the configuration of FIG. 4. One example of an alternative configuration is shown in FIG. 6.

The configuration of the timing detection unit 19 is similar to that of FIG. 4. However, the configuration of the ramp wave generation unit 20A differs.

In particular, the non-inversion input terminal of the operational amplifier 33 is coupled to the negative input terminal of the PWM comparator 22 and also is coupled to the collector of the transistor 31 through resistor 38.

The non-ground side terminal of the capacitor 32 is coupled to the non-inversion input terminal of the operational amplifier 33 and is coupled to the power supply terminal 29 through resistor 39.

An NPN transistor 40 in parallel to the capacitor 32 is configured as a common-emitter type. The collector of this transistor is coupled to the capacitor 32 through a resistor 41 and the base thereof and also is coupled to the output terminal of the operational amplifier 33 through a resistor 42.

The voltage dividing resistors 34, 34 are provided at the inversion input terminal of the operational amplifier 33. A predetermined reference voltage (Vref) is applied to one end of the voltage dividing resistors, and the collector of an NPN transistor 43 is coupled to the other end of the voltage dividing resistors.

The transistor 43 is configured as a common-emitter type so that the comparator implemented by the operational amplifier 33 has hysteresis characteristics. The base of this transistor is coupled to the output terminal of the operational amplifier 33 and a constant current source 45 through resistor 44. The output terminal of the operational amplifier 33 is coupled to the power supply terminal 29 through the constant current source 45.

In this example, the terminal voltage of the capacitor 32 is supplied to the PWM comparator 22 as Vramp, but the two transistors 31, 40 are provided in parallel to this capacitor. The transistor 40 serves to define the lower limit of the frequency of the ramp wave. Thus, the discharge path for the capacitor 32 is formed when this transistor is placed in the on-state. Like the previous example, the transistor 31 serves to discharge the capacitor 32 when detecting the current boundary.

The circuit can be made small so that it can be used as the lighting circuit for a discharge lamp serving as a light source in an automobile lamp. Therefore, even though the space in the vehicle for placement of the parts may be limited, the configurations describe above may be used. At the same time, the requirements for an increase in the frequency and efficiency of the DC—DC conversion circuit constituting the lighting circuit can be attained by employing the foregoing configurations.

As is clear from the foregoing description, control in the current boundary mode can be obtained without an overly complex circuit configuration. Thus, the invention may provide advantages such as miniaturization, savings of a space and cost reduction.

According to the invention claimed in claim 2, the configuration of a differentiation detection means is simple.

Other advantages may be apparent from the foregoing description, the accompanying drawings, and the claims. Other implementations are within the scope of the claims.

What is claimed is:

1. A DC voltage conversion circuit comprising:
   a flyback-type circuit configuration having a transformer and a switching element; and
   a control means for performing control in a current boundary state so that the transformer accumulates energy during an on-state of the switching element, wherein the accumulated energy is outputted from a secondary winding during an off-state of the switching element, and the switching element is placed in the on-state when the accumulated energy is completely outputted from the secondary winding,
   wherein a voltage applied to the switching element is differentiated to detect a discharge termination point, at which a secondary current of the transformer becomes zero, so as to change a switching frequency of the switching element by the control means.

2. A DC voltage conversion circuit according to claim 1, wherein the voltage applied to the switching element is differentiated by a capacitor to detect an edge of the voltage to detect the discharge termination point.

3. A DC voltage conversion circuit according to claim 1, wherein the switching element comprises a field effect transistor, and wherein a voltage between a drain and a source of the field effect transistor is differentiated to detect the discharge termination point.

4. A DC voltage conversion circuit according to claim 1, further comprising:
   a timing detection unit to detect the discharge termination point;
   a ramp wave generation unit to generate a ramp wave whose frequency is variably controlled in accordance with a signal from the timing detection unit; and
   a calculation control unit to compare levels between the ramp wave from the ramp wave generation unit and a control voltage to supply a control signal to the switching element.

5. A DC voltage conversion circuit according to claim 4, the ramp wave generation unit comprises a capacitor that is charged until the timing detection unit detects the discharge termination point, and wherein the capacitor of the ramp wave generation unit is discharged when the timing detection unit detects the discharge termination point.

6. A lighting circuit for a discharge lamp comprising:
   a DC—DC voltage conversion circuit as recited in any one of claim 1 through 3;
   a DC-AC voltage conversion circuit coupled to the DC—DC voltage conversion circuit and adapted to convert a voltage signal from the DC—DC voltage conversion circuit to an AC voltage signal;
   a starter circuit coupled to the DC-Ac voltage conversion circuit and adapted to generate a pulse signal that are superimposed on the AC voltage signal so as to provide a starter signal; and
   a control circuit adapted to control the DC—DC voltage conversion circuit and the DC-AC voltage conversion circuit.

7. A lighting circuit according to claim 6, comprising a discharge lamp coupled to the starter circuit to receive the starter signal.

8. A lighting circuit according to claim 7, wherein the DC—DC voltage conversion circuit comprises:
   a timing detection unit to detect the discharge termination point;
   a ramp wave generation unit to generate a ramp wave whose frequency is variably controlled in accordance with a signal from the timing detection unit; and
   a calculation control unit to compare levels between the ramp wave from the ramp wave generation unit and a control voltage to supply a control signal to the switching element.

9. A lighting circuit according to claim 8, wherein the ramp wave generation unit comprises a capacitor that is charged until the timing detection unit detects the discharge termination point, and wherein the capacitor of the ramp wave generation unit is discharged when the timing detection unit detects the discharge termination point.

* * * * *